(12) United States Patent
Chang et al.

(10) Patent No.: US 12,438,505 B2
(45) Date of Patent: Oct. 7, 2025

(54) INSTALLATION TEST CIRCUIT FOR PV SYSTEM WITH RAPID SHUTDOWN

(71) Applicant: Hangzhou Lianxintong Semiconductor Co., Ltd., Hangzhou (CN)

(72) Inventors: Hao-Shun Chang, Zhubei (TW); Hsin-Hsien Li, Zhubei (TW)

(73) Assignee: HANGZHOU LIANXINTONG SEMICONDUCTOR CO., LTD., Hangzhou (CN)

(*) Notice: Subject to any disclaimer, the term of this patent is extended or adjusted under 35 U.S.C. 154(b) by 0 days.

(21) Appl. No.: 18/293,232

(22) PCT Filed: Dec. 1, 2021

(86) PCT No.: PCT/CN2021/134772
§ 371 (c)(1),
(2) Date: Jan. 29, 2024

(87) PCT Pub. No.: WO2023/015782
PCT Pub. Date: Feb. 16, 2023

(65) Prior Publication Data
US 2024/0258967 A1    Aug. 1, 2024

(30) Foreign Application Priority Data

Aug. 11, 2021  (CN) .......................... 202110918083.2

(51) Int. Cl.
*H02S 50/10*    (2014.01)
(52) U.S. Cl.
CPC .................................. *H02S 50/10* (2014.12)

(58) Field of Classification Search
CPC ........... H02M 7/53871; H02M 1/0003; H02M 1/126; H02J 3/00; H02S 50/10; G01R 19/00; Y02E 10/50
(Continued)

(56) References Cited

U.S. PATENT DOCUMENTS

| 2016/0018456 | A1* | 1/2016 | Yilmaz | H02S 50/10 |
| | | | | 324/761.01 |
| 2016/0077162 | A1 | 3/2016 | Chen | |
| 2020/0106264 | A1* | 4/2020 | Yu | H02H 5/12 |

FOREIGN PATENT DOCUMENTS

| CN | 101980038 A | 2/2011 |
| CN | 202267703 U | 6/2012 |

(Continued)

*Primary Examiner* — Richard Tan
(74) *Attorney, Agent, or Firm* — Muncy, Geissler, Olds & Lowe, P.C.

(57) ABSTRACT

An installation test circuit for a photovoltaic (PV) system with rapid shutdown includes a voltage generator, which is coupled to a solar panel in the PV system, and generates a first output voltage and a second output voltage according to a first control signal, a second control signal and a voltage source outputted by the solar panel. A voltage difference between the first output voltage and the second output voltage is less than or equal to the voltage source. The first control signal and the second control signal control the voltage generator to determine the first output voltage and the second output voltage. A test output voltage can be generated for solar panel using a minimum number of circuit components, ranging from 0.6V to 1V. This makes it easier to determine the correct installation of the photovoltaic system by measuring a lower output voltage compared to existing technologies.

6 Claims, 3 Drawing Sheets

(58) Field of Classification Search
USPC .......................................................... 307/84
See application file for complete search history.

(56) References Cited

FOREIGN PATENT DOCUMENTS

| | | |
|---|---|---|
| CN | 102541137 A | 7/2012 |
| CN | 202710712 U | 1/2013 |
| CN | 102967766 A | 3/2013 |
| CN | 103852623 A | 6/2014 |
| CN | 107887895 A | 4/2018 |
| WO | WO 2021118062 A1 | 6/2021 |

* cited by examiner

INSTALLATION TEST CIRCUIT FOR PV SYSTEM WITH RAPID SHUTDOWN

BACKGROUND OF THE INVENTION

Field of the Invention

This disclosure relates to an installation test circuit, and more particularly to an installation test circuit for a photovoltaic (PV) system with rapid shutdown.

Description of the Related Art

At present, no installation test circuit is installed in a PV system. After solar panels have been installed in a serial connection manner or after multiple stages of solar panels have been installed, an easy test for measuring an output voltage can be performed in a normal shutdown condition to determine whether the installation is correct. When each solar panel has the output voltage ranging from 10 to 80 volts, the multiple stages of solar panels serially connected together may have the test output voltage ranging from 100 to 800 volts.

BRIEF SUMMARY OF THE INVENTION

In order to facilitate the installation test of solar panels, it is specified to output an output voltage ranging from 0.6 to 1.0 volts from positive and negative output terminals. That is, this disclosure utilizes the least circuit elements to generate an installation test output voltage ranging from 0.6 to 1.0 volts. That is, after multiple stages of solar panels have been serially connected in the shutdown condition, the output voltage lower than that of the prior art can be measured to simply determine whether the installed PV system is correct or not.

This disclosure provides an installation test circuit capable of shortening the installation test time of the PV system and enhancing the safety.

This disclosure provides an installation test circuit for a PV system with rapid shutdown. The installation test circuit includes: a voltage generator, which is coupled to a solar panel in the PV system, and generates a first output voltage and a second output voltage according to a first control signal, a second control signal and a voltage source outputted by the solar panel, wherein a voltage difference between the first output voltage and the second output voltage is less than or equal to the voltage source; wherein the first control signal and the second control signal control the voltage generator to determine the first output voltage and the second output voltage.

DETAILED DESCRIPTION OF THE INVENTION

Symbols Description: installation test circuit: 100 and 300; voltage generator: 101; high-voltage rectifier: 102; level converter: 103; switch SW1~SW3; solar panel: PV; voltage source: PV+ and PV−; output voltage: OV1 and OV2; control signal: C1 and C2; regulation voltage: D1 and D2; diode: dio1 and dio2; resistor: R1~R5.

Figure 1:
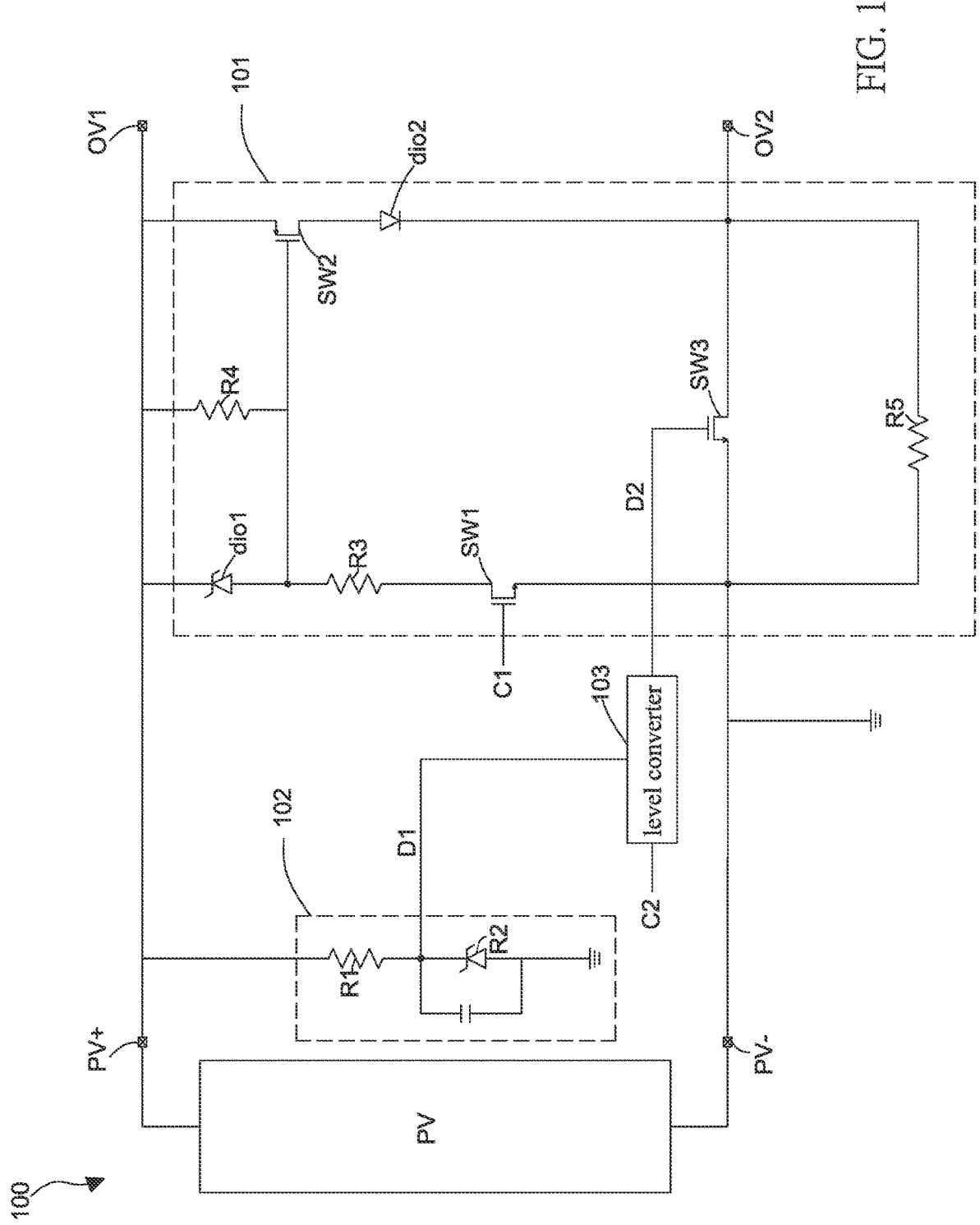
FIG. 1 is a schematic view showing an embodiment of this disclosure.

FIG. 1 is a schematic view showing an embodiment of this disclosure. Referring to FIG. 1, this disclosure provides an installation test circuit 100 for a PV system with rapid shutdown. The installation test circuit 100 includes a voltage generator 101, a high-voltage rectifier 102 and a level converter 103.

The voltage generator 101 is coupled to a solar panel PV in the PV system, and generates a first output voltage OV1 and a second output voltage OV2 according to a first control signal C1, a second control signal C2 and a voltage source PV+ outputted by the solar panel. A voltage difference between the first output voltage OV1 and the second output voltage OV2 is less than or equal to the voltage source PV+. The high-voltage rectifier 102 is coupled to the solar panel PV, and provides a first regulation voltage D1 according to the voltage source PV+. The first control signal C1 and the second control signal C2 control the voltage generator 101 to determine the first output voltage OV1 and the second output voltage OV2 of the voltage generator 101.

The level converter 103 is coupled to the high-voltage rectifier 102, performs boost conversion according to the first regulation voltage D1 and the second control signal C2, and outputs a second regulation voltage D2.

In one embodiment, the high-voltage rectifier 102 includes a first resistor R1 and a second resistor R2, wherein the first regulation voltage D1 is a divided voltage of the voltage source PV+ generated after the first resistor R1 and the second resistor R2 are serially in series.

In another embodiment, the second resistor R2 may be implemented by a Zener diode, so that the voltage value of the first regulation voltage D1 can be stabilized.

In one embodiment, the voltage generator 101 includes a first switch SW1, a second switch SW2 and a third switch SW3. The first switch SW1 is coupled to the solar panel, and a first diode dio1 and a third resistor R3 connected in series are coupled to and between the first switch SW1 and the solar panel. The first diode dio1 is parallelly connected to a fourth resistor R4. The first switch SW1 determines whether to turn on or not according to the first control signal C1.

The second switch SW2 is coupled to the first diode dio1 and the third resistor R3, and determines whether to turn off or turn on according to a divided voltage divided by the first diode dio1, the third resistor R3 and the fourth resistor R4. When the first switch SW1 turns on, the second switch SW2 turns on according to the divided voltage of the voltage source PV+ divided by the first diode dio1, the third resistor R3 and the fourth resistor R4.

In addition, a second diode dio2 is serially connected to the second switch SW2. When the second switch SW2 turns on, a current flowing through the second diode dio2 is generated from the first output voltage OV1, and the second output voltage OV2 is determined according to a divided voltage generated after the second switch SW2 and a fifth resistor R5 are connected in series.

The third switch SW3 is coupled to the level converter 103 and parallelly connected to the fifth resistor R5. When the third switch SW3 turns on, the voltage difference between the first output voltage OV1 and the second output voltage OV2 is equal to the voltage source PV+ because the other voltage source PV− is grounded. In one embodiment, the third switch SW3 determines whether to turn on according to the second control signal C2. In other words, the level converter 103 outputs the second regulation voltage D2 according to the second control signal C2 and the first regulation voltage D1 to determine the turn on state of the third switch SW3.

In one embodiment, the first switch SW1 and the third switch SW3 turn on at different time instants. In another embodiment, each of the first switch SW1 and the third switch SW3 is implemented by an N-type metal-oxide-semiconductor field-effect transistor (NMOSFET), and the second switch SW2 is implemented by a P-type metal-oxide-semiconductor field-effect transistor (PMOSFET).

The operation behaviors of the installation test circuit 100 will be described in the following.

In a first state where the solar panel PV is just installed and ready to supply power, the low-voltage first control signal C1 is "0" such that the first switch SW1 turns off, the low-voltage second control signal C2 is "0" such that the third switch SW3 turns off, and the solar panel PV is just installed in an initial state.

In a second state (installation test mode), the low-voltage first control signal C1 is "1" such that the first switch SW1 turns on, the low-voltage second control signal C2 is "0" such that the third switch SW3 turns off, and the voltage difference between the first output voltage OV1 and the second output voltage OV2 ranges from about 0.6 to 1.0 volts.

In a third state (transitional state), the low-voltage first control signal C1 is "0" such that the first switch SW1 turns off, and the low-voltage second control signal C2 is "0" such that the third switch SW3 turns off.

In a fourth state (normal power generating mode), the low-voltage first control signal C1 is "0" such that the first switch SW1 turns off, the low-voltage second control signal C2 is "1" such that the third switch SW3 turns on, and the voltage difference between the first output voltage OV1 and the second output voltage OV2 is equal to the voltage source PV+.

Figure 2:
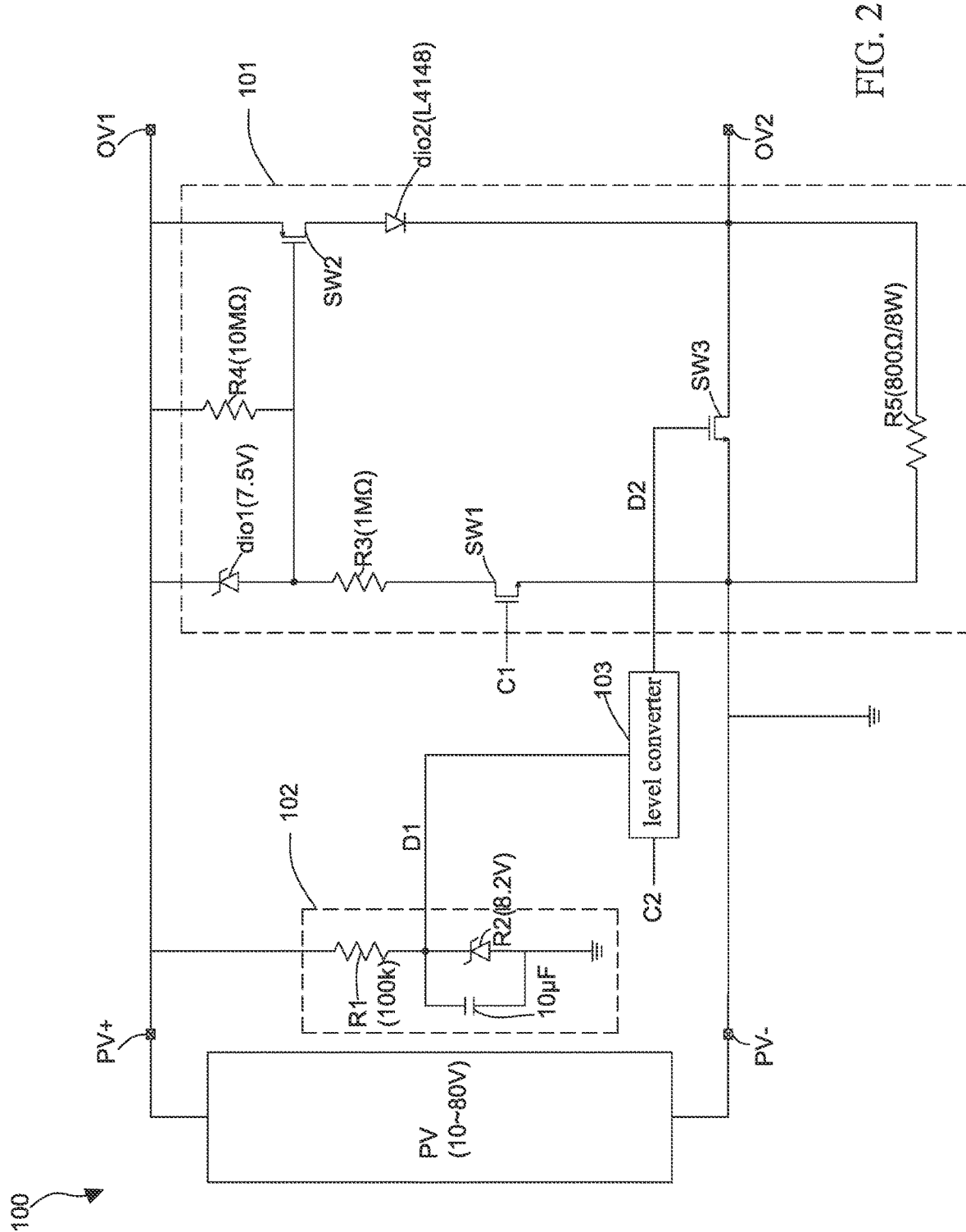
FIG. 2 is a schematic implementation view showing an embodiment of this disclosure.

FIG. 2 is a schematic implementation view showing an embodiment of this disclosure. Referring to FIGS. 2 and 1, the voltage sources PV+ and PV− generated by the solar panel range from about 10 to 80 volts in this embodiment. In order to provide the stable high voltage in this embodiment, the first resistor R1 in the high-voltage rectifier 102 has the resistance of 100 kΩ, and the second resistor R2 is implemented by a Zener diode of 8.2 volts, so the high-voltage rectifier 102 generates the voltage of 8.2 volts supplied to the level converter 103 to control the third switch SW3. In addition, two terminals of the second resistor R2 are coupled to a capacitor, which has a capacitance of 10 μF and functions to stabilize the voltage value of the first regulation voltage D1.

When the second state (installation test mode) is entered, the first switch SW1 turns on, and the divided voltage between the third resistor R3 of 1 MΩ and the fourth resistor R4 of 10 MΩ is parallelly connected to the second diode dio2. Furthermore, the second diode dio2 is implemented by a Zener diode of 7.5 volts. In this case, the second switch SW2 turns on therewith.

When the solar panel outputs the voltage of 10 volts, the second diode dio2 has the voltage drop of 0.8 volts and a current of 11.5 mA flowing therethrough according to the fifth resistor R5 of 800Ω, and the fifth resistor R5 withstands the power of about 0.1 watts. At this time, the overall maximum load that can be withstood is about 10.5 mA, and the voltage of 0.6 volts is outputted.

When the solar panel outputs the voltage of 80 volts, the second diode dio2 has the voltage drop of 1 volt and a current of 99 mA flowing therethrough according to the fifth resistor R5 of 800Ω, and the fifth resistor R5 withstands the power of about 7.8 watts. At this time, the overall maximum load that can be withstood is about 98 mA, and the voltage of 0.6 volts is outputted.

When the normal mode is entered, the first switch turns off, the second switch may also turn off, and then the second control signal C2 is "1" such that the third switch SW3 turns on to connect the second output voltage OV2 and the voltage source PV− together. Because the voltage source PV− is grounded, the voltage difference between the first output voltage OV1 and the second output voltage OV2 will be equal to the voltage source PV+.

Figure 3:
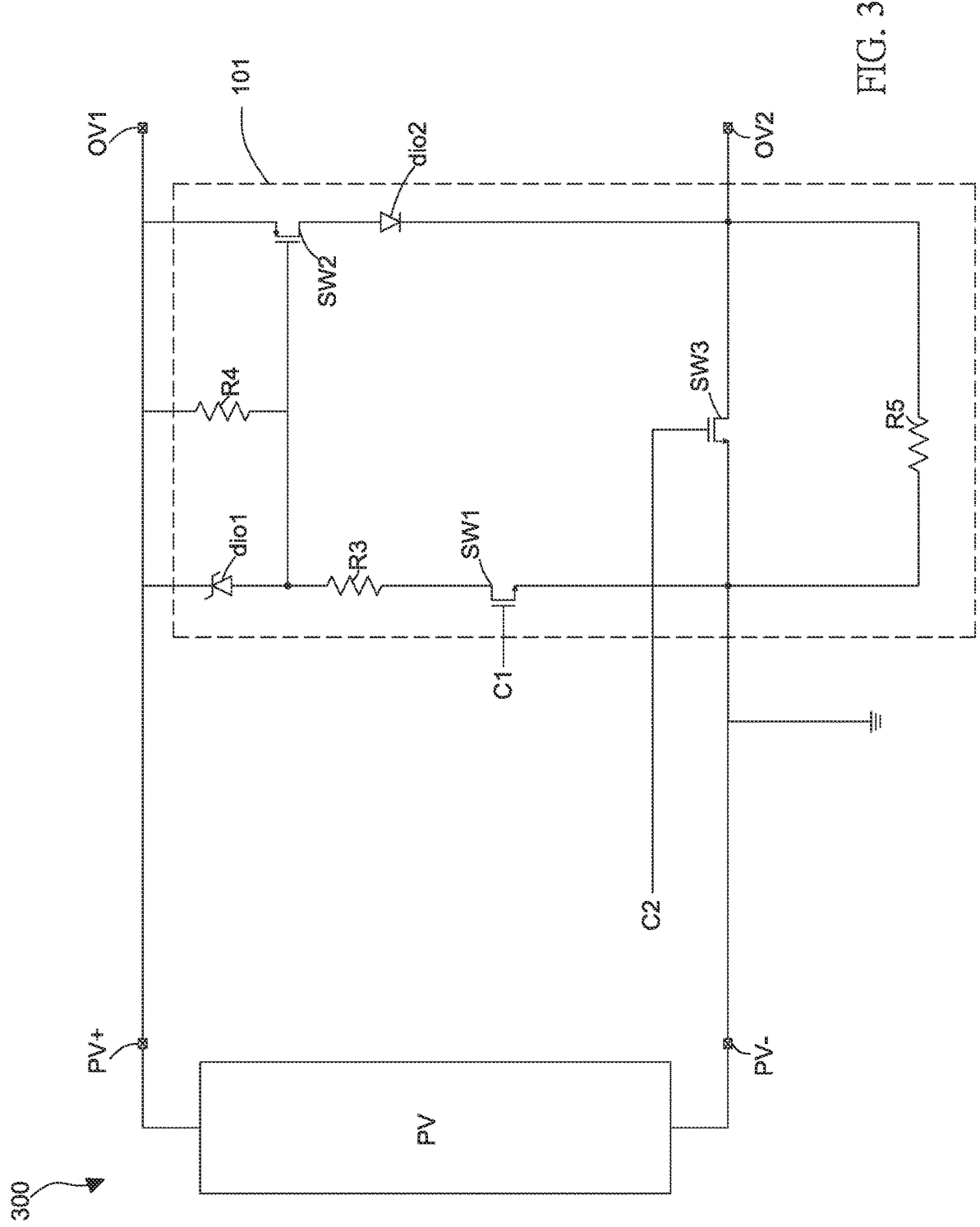
FIG. 3 is a schematic view showing an embodiment of this disclosure.

FIG. 3 is a schematic view showing an embodiment of this disclosure. Referring to FIG. 3 of this embodiment, the difference between the installation test circuits 300 and 100 resides in that the installation test circuit 300 does not include the high-voltage rectifier 102 and the level converter 103. In this embodiment, the third switch SW3 determines whether to turn on directly according to the second control signal C2, and the other principles are the same as those mentioned hereinabove, and detailed descriptions thereof will be omitted here.

In summary, this disclosure provides the installation test circuit after the solar panel has been installed. In the installation test mode, the output terminals thereof may output an output voltage ranging from 0.6 to 1.0 volts. That is, this disclosure utilizes the least circuit elements to generate the installation test output voltage, ranging from 0.6 to 1.0 volts, to be output for testing the solar panel. Whether the PV system has been installed correctly or not can be determined by measuring the output voltage lower than that of the prior art.

What is claimed is:

1. An installation test circuit for a photovoltaic (PV) system with rapid shutdown, the installation test circuit comprising:
   a voltage generator, which is coupled to a solar panel in the PV system, and generates a first output voltage and a second output voltage according to a first control signal, a second control signal and a voltage source outputted by the solar panel, wherein a voltage difference between the first output voltage and the second output voltage is less than or equal to the voltage source,
   wherein the first control signal and the second control signal control the voltage generator to determine the first output voltage and the second output voltage; and
   in an installation test mode, the voltage difference between the first output voltage and the second output voltage ranges from about 0.6 to 1.0 volts.

2. The installation test circuit according to claim 1, further comprising:
   a high-voltage rectifier, which is coupled to the solar panel and provides a first regulation voltage according to the voltage source; and
   a level converter, which is coupled to the high-voltage rectifier, performs boost conversion according to the first regulation voltage and the second control signal, and outputs a second regulation voltage.

3. The installation test circuit according to claim 2, wherein the high-voltage rectifier comprises a first resistor and a second resistor, and the first output voltage is a divided voltage of the voltage source generated after the first resistor and the second resistor are connected in series.

4. The installation test circuit according to claim 3, wherein the voltage generator comprises:

a first switch coupled to the solar panel, wherein a first diode and a third resistor serially connected together are connected to and between the first switch and the voltage source, the first diode is parallelly connected to a fourth resistor, and the first switch determines whether to turn on or not according to the first control signal;

a second switch coupled to the first diode and the third resistor, wherein the second switch determines whether to turn off or turn on according to a divided voltage divided by the first diode, the third resistor and the fourth resistor; wherein when the first switch turns on, the second switch turns on according to the divided voltage of the voltage source divided by the first diode, the third resistor and the fourth resistor;

a second diode serially connected to the second switch, wherein when the second switch turns on, a current flowing through the second diode is generated from the first output voltage, and the second output voltage is determined according to a divided voltage, generated after the second switch and a fifth resistor are connected in series, minus a voltage drop of the second diode; and a third switch coupled to the level converter and parallelly connected to the fifth resistor, wherein when the third switch turns on, the voltage difference between the first output voltage and the second output voltage is equal to the voltage source, wherein the first switch and the third switch turn on at different time instants.

5. The installation test circuit according to claim 4, wherein in the installation test mode, the first control signal is "1" such that the first switch turns on, the second control signal is "0" such that the third switch turns off.

6. The installation test circuit according to claim 4, wherein in a normal power generating mode, the first control signal is "0" such that the first switch turns off, the second control signal is "1" such that the third switch turns on, and the voltage difference between the first output voltage and the second output voltage is equal to the voltage source.

* * * * *